April 12, 1938.  A. L. FREEDLANDER  2,113,561
BELT
Filed Feb. 27, 1935    2 Sheets-Sheet 2

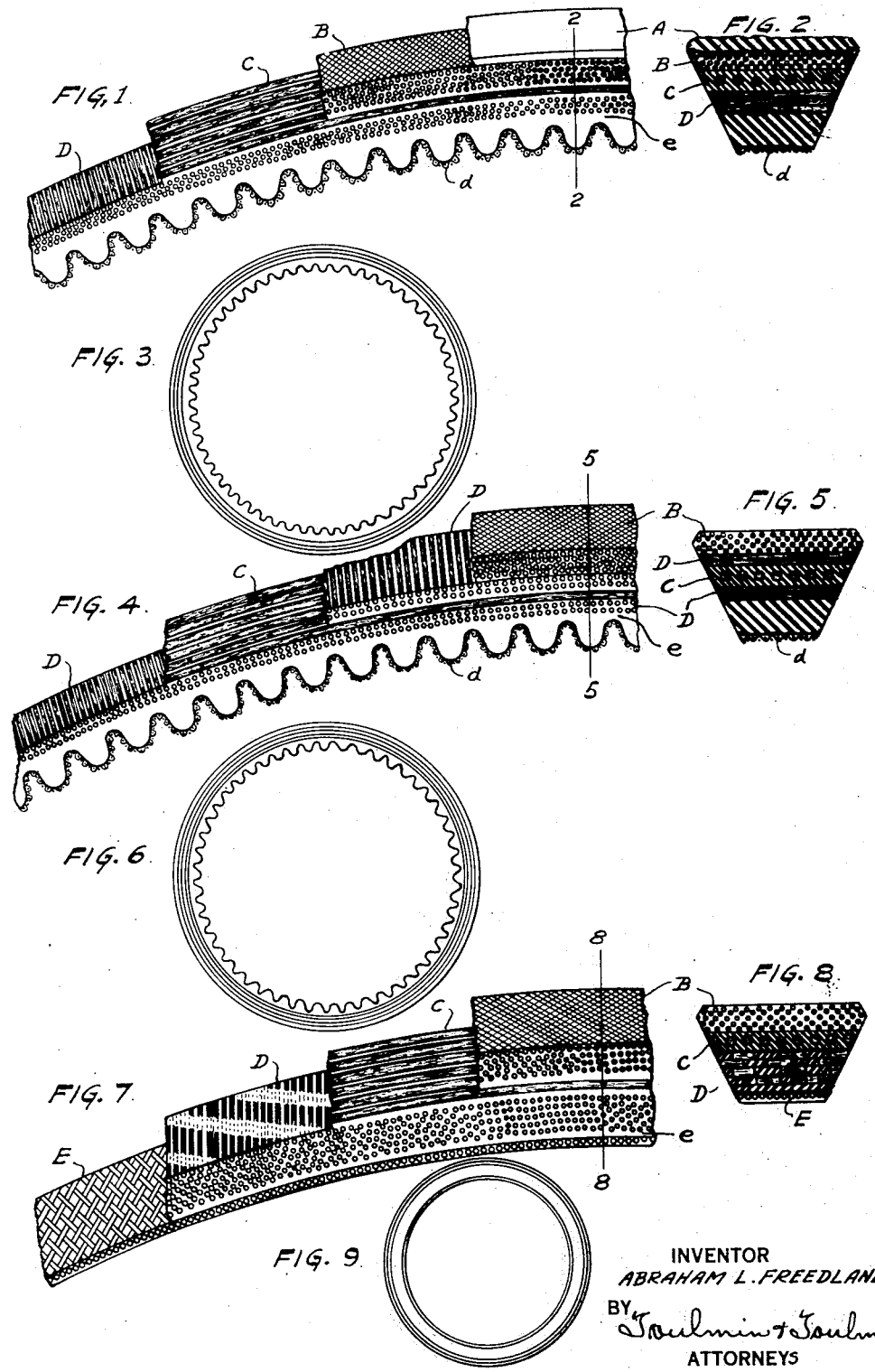

INVENTOR
ABRAHAM L. FREEDLANDER.
BY
Toulmin & Toulmin
ATTORNEYS

Patented Apr. 12, 1938

2,113,561

UNITED STATES PATENT OFFICE 2,113,561

BELT

Abraham L. Freedlander, Dayton, Ohio, assignor to The Dayton Rubber Manufacturing Company, Dayton, Ohio, a corporation of Ohio Application February 27, 1935, Serial No. 8,532

15 Claims. (Cl. 74—233)

This invention relates to improvements in power transmitting belts composed of circumferential members laminated on each other.

The primary object is to produce a belt consisting of an extensible or outer member composed of rubberized bias-cut fabric, a neutral axis member consisting of a series of rubberized longitudinal cords, and a compression member made in whole or in part of rubberized transverse cords; whereby the belt will stretch or extend in the outer or extensible portion when passing round pulleys; will comprise an inextensible neutral axis member whose longitudinal cords will act to carry the load or strain of transmitting the power; and a compression member which with its transverse cords will impart to the belt a rigid and firm body which will not buckle or bend transversely, notwithstanding the belt is for use in V-shaped pulley grooves, and which transverse cords will actively convey to the surface of the belt and then to the metal of the pulley, the heat which is generated by the use of the belt.

A further object of this invention is to provide such a belt with a plurality of laminations or members having these transverse belt-stiffening and heat-conveying cords.

And a third object of this invention is to provide such a belt with an extensible member formed of rubberized bias-cut fabric, and an inner or compression member formed of rubberized bias-cut cord fabric.

These features and their objects, as also other incidental features and objects, will appear from the following specification in connection with the drawings.

In the accompanying drawings:

Figure 1 is a perspective view, on an enlarged scale, of a section of my improved belt.

Figure 2 is a transverse sectional view of Fig. 1 on the line 2—2, enlarged.

Figure 3 is a side elevation of such belt in its complete endless form.

Figure 4 is a like perspective view to Fig. 1 showing one modified form.

Figure 5 is a transverse sectional view on the line 5—5 of Fig. 4.

Figure 6 is a side elevation of the belt in its complete endless form.

Figure 7 is a perspective view of a further modified form.

Figure 8 is a transverse sectional view on the line 8—8 of Figure 7.

Figure 9 is a side view of this second modified form shown in its complete circular formation.

Figure 10:
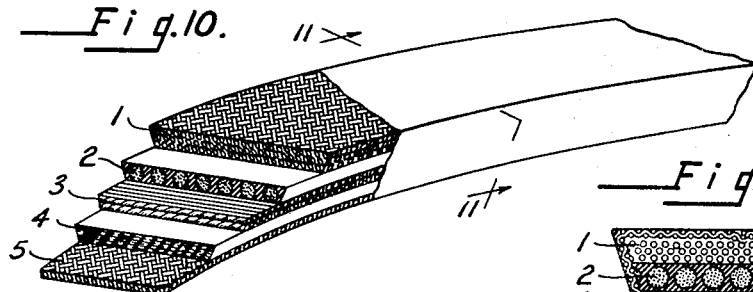
Figure 10 is a perspective view on an enlarged scale, of a section of my improved belt in modified form.

Referring to the figures designated 1 and 2, it will be seen that the belt comprises an outer thin vulcanized rubber covering A. Next to it, on the side in the direction of the center of the belt is the extension member B formed of rubberized bias-cut fabric, so that when it is under stretching strains by reason of going over the peripheries of the pulleys, it will extend or elongate to adjust itself to the longer travel round the outside of its then circumference.

By the term "bias-cut", I mean that the fabric strip or strips which form this extensible member are cut on an angle to the direction of the threads or cords, as indicated by the angular intersecting lines shown in this member B. Because of the angular positions of the threads or cords this member will elongate when subjected to the strains incident to traveling over the pulleys, and this elongation enables this member to go round the pulleys without suffering any breaking strain.

The letter C designates the next or neutral axis member of the belt. This member may be made of a single strip of rubberized cord fabric, or of a series of them according to the use to which the belt is to be put, or its size.

The cords run circumferentially round the belt, and the strains being circumferential, the cords are positioned circumferentially or lengthwise in their course round the circle of the belt. These cords are imbedded in a layer of vulcanized rubber compounded to give the required toughness and flexibility.

These cords are essentially inextensible. They are usually prestretched before being fabricated in the belt. They occupy the neutral axis zone so that any tendency for this member to stretch or compress to any appreciable degree is eliminated.

The neutral axis zone, as the name implies, is the zone where there is the least of any elongation or compression tendencies.

This neutral zone member, be it constructed of one or more layers, is in the nature of a backbone of the belt as the pulley strains incident to transmitting power from the driving pulley to the driven pulley are borne or carried by it.

The inner, or compression member, indicated at D, is made of rubberized square cut cord fabric with its cords laid transversely of the belt. Such member is formed of vulcanized rubber and cord fabric, the rubber enveloping the fabric. These transverse cords act in three essential capacities; *one,* as transverse struts or braces which, due to their great number, and to their being embedded in the body of the rubber strip, enables them to brace the belt against transverse buckling or bending up or out at their sides due to the normal compressing tendency of the sloping walls of the V-shaped grooves in which the belts work; *two,* as transverse heat conveyors which take up the heat, particularly in the more interior parts of the belt, and transmit it to the walls of the pulley grooves against which the ends of these cross cords contact when the belt is in use; *three,* some of the belts of this invention are manufactured with their inner or compression side forming an unbroken circle, and others of these belts have applied to their inner or compression side, which takes its name from the fact that it bends around the pulleys where the pulleys are smallest in diameter, so that there is a crowding of the material when the belt is so pronouncedly bent, a series of spaced apart teeth forming an inner rim in the nature of an internal cog wheel. The spaces between the cog teeth readily facilitate the so-called compression or crowding of the inner part of the belt. The teeth are generally made of rubber mixed with delicate fluffy fibrous material, such as would result from grinding or reducing fabric to a fuzzy state. The exposed surfaces of the teeth are covered with a fabric strip as indicated at d.

It will now be observed that my improved belt, in its functioning members, comprises a combination of parts or zones which are vulcanized together by any of the usual vulcanizing processes practiced in the art of manufacturing what are generally known as rubber goods. The strips or components of this belt are narrowed transversely as they extend inward. This is done to conform the belt to a V-shape, which is the shape in cross-section of the grooves within which these belts are placed in use. The exposure of the edges of the different laminae of the belt, and particularly the longitudinal cords which lie in the neutral axis member, functions in increasing the frictional grip or contact between the tapering sides of the belt and the like tapering walls of the pulley grooves. Hence this type of belt is known as V-shaped belt.

It will further be understood that the combination of the several belt members—the extension member B, the inextensible neutral axis member C, and the laterally rigid compression member D, all cooperate with each other, so that when vulcanized together they constitute an efficient power transmitting instrumentality with an extensible or elongating member, a non-extensible neutral zone member and a laterally-rigid or compression member, all of which coact in producing a highly efficient and desirable power belt.

Figure 3 shows the belt in its entirety, in which it is endless or circular.

Referring to Figures 4 and 5, it will be seen that the belt there shown is modified from Figure 1 in the preferable omission of the outer rubber covering A, and in the provision of two zones each having the transverse cord members constituting the struts, one such member on the outer and the other on the inner side of the neutral axis member with its longitudinal cords.

Figure 6 shows a belt of this form in its entirety or circular form.

Referring now to Figures 7 and 8, it will again be seen that in this form the belt has the extensible member B which, with the bias-cut fabric whose threads run obliquely, will elongate sufficiently in going over the pulleys; and that in this form there is also the neutral zone member C with its longitudinal load-carrying cords.

Figure 9 is a view in its entirety of the belt shown in Figs. 7 and 8, showing its endless or ring-like form.

To these features are added the belt member D, which also has the transverse cords or threads in a slightly different form. The fabric of which this member D is made, is such that the cords or threads appear and disappear and then reappear in a lateral direction, the intervening spaces being covered or occupied by the rubberized fabric which carries the cords or threads. The effect, however, of this member D is the same as in the other forms where the transverse cords are exposed in their full length.

And there is a further slight modification in Fig. 7 as compared with Fig. 1, in that the further compression member E is constructed of obliquely-positioned cords carried by the vulcanized rubber. The oblique position of these cords facilitates the compression movement of the inner part of the belt which fits over the smaller part of the diameter of the pulley groove.

Again, it will be seen that the function and performance of the preferred form shown in Figs. 1 to 3, and the modified forms shown in Figs. 4 to 6, and Figs. 7 to 9, are all the same. In each the extensible member elongates when going over the larger part of the pulley diameter; in each the neutral zone member C carries the load and is essentially inextensible, and in each the transverse cords D function alike in laterally-stiffening the belt and carrying off the heat from the interior to the surface.

In Figs. 1 and 4 the inner surface of the belt is formed with the cog teeth d in addition to that portion e of the inner member which comprises the vulcanized rubber and cords, while in Fig. 7 the further inner portion E is made efficient in bending or compressing by the use of the angularly placed cords which it comprises. So that this bending or so-called compressing quality is present in all of the forms.

I will now refer to the several forms of belt construction shown in Figs. 10 to 14 inclusive. First, as to Fig. 10—it shows the outer or extensible member I formed of laminations or plies of bias-cut square-woven fabric. These layers are rubberized and vulcanized each as a homogeneous strip of such bias-cut fabric and rubber. Due to the bias position of the fabric threads, this member is extensible or yielding, so that it will elongate when such belt in use gets to the pulleys over which it will pass. In bending around the pulleys this extensible member elongates, but comes back to its normal position when going through the straight stretches of the belt's travel.

The next or neutral axis member is constructed of longitudinal cords 2 of great strength and sufficient number to stand the stresses and strains incident to transmitting the power from the driving pulley to the driven pulley. These cords are usually prestretched and are therefore substantially non-stretchable. This ply so made of such cords is composed also of rubber suited to the purpose. The cords and the rubber form a homogeneous mass united by vulcanizing.

The next layer or ply is the lateral-stiffening member 3 composed of transverse cords rubberized and vulcanized. The number of plies of these transverse cords may vary, but preferably they consist of two plies. These cords impart to the belt a rigidity and stiffness laterally, so that the belt is braced against buckling or bending when drawn down in use tightly into the V-shaped groove of the driving and driven pulley. These transverse cords act as struts and perform this stiffening function, without interfering with the longitudinal flexibility of the belt by which capacity the belt readily bends in going around pulleys, regardless of the diameter of the pulleys.

The next member of this modification is designated 4 and consists of a suitably thick strip of a composition comprising rubber impregnated with fine fluffy fibrous material. This fibrous material consists of fabric disintegrated until reduced to short fibrous pieces. In fabricating this fiber impregnated rubber member 4 the fibers are laid with their greatest length transverse or crosswise the belt. This fiber material is rubberized by any suitable rubber composition and then vulcanized and made ready to be laminated with the other members of the belt. This fiber impregnated rubber member also adds lateral rigidity to the belt as well as excellent flexibility and sufficient compressibility to readily form a part of the compression or inner member or portion of the belt. Such compression or partial folding of the inner belt members results from the travel of the belt around the pulleys.

A further compression member 5 is composed, like the extension member 1, of bias-cut square woven fabric rubberized and vulcanized to form a homogeneous mass.

Figure 11:
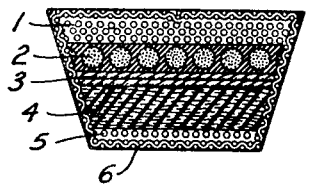
Figure 11 is a transverse sectional view of another modified form, the section taken on the line 11, omitting the fiber impregnated rubber composition shown in Fig. 10.

Fig. 11 is a transverse sectional view of Fig. 10 and shows the same construction as to the extensible member 1; the longitudinal cord neutral axis member 2; the transverse cord stiffening member 3; the fiber impregnated and rubber compression member 4 and the bias-cut square woven fabric member 5, all of these members being enclosed in a wrapper or outer cover of rubberized fabric indicated at 6. A belt of this construction is preferably formed by laying ply on ply in a mould until all the plies are laminated; the wrapper or cover being first laid in the mould and the belt proper built up in the mould in the manner just stated. When completed the outer margins of the wrapper are folded over the outer member of the belt and overlapped. This structure so built up is then vulcanized to form a complete homogeneous mass.

Figure 12:
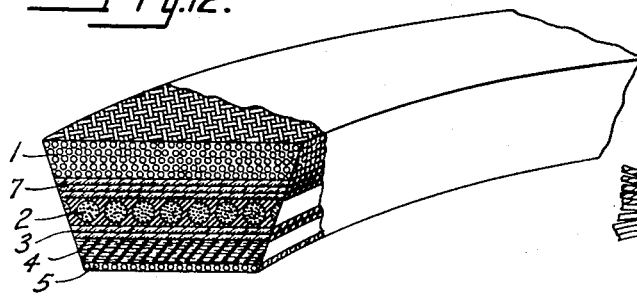
Figure 12 is a further modification shown in perspective, with the belt severed transversely to expose the several plies or laminations showing transverse cords above and below the neutral axis longitudinal cords.
Figure 15:
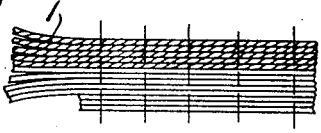
Figure 15 is a detailed view of the cord material showing the cords, which may be optionally held together by light threads.

Fig. 12 shows the same construction of plies 1, 2, 3, 4, 5 shown in Figs. 10 and 11, plus an additional member of transverse cords 7 placed above the longitudinal neutral axis cords 2. In this form the lateral stiffening of the belt is increased, and the struts appear both below and above the neutral axis member comprised of the longitudinal cords 2. Otherwise than as here stated, Fig. 12 agrees with Figs. 10 and 11.

In Fig. 13 again the same structure or members 1, 2, 3, 4 and 5 are shown as in Figs. 10, 11 and 12, with the exception that in Fig. 13 the transverse cords 3 are placed above, and only above, the longitudinal cords 2. The extensible member 1 is of bias-cut square woven fabric, the longitudinal neutral axis cord member 2, the fiber impregnated rubber member 4 and the further bias-cut square fabric member 5 are shown and are all respectively rubberized and vulcanized as heretofore stated in connection with Fig. 10, for instance.

Figure 13:
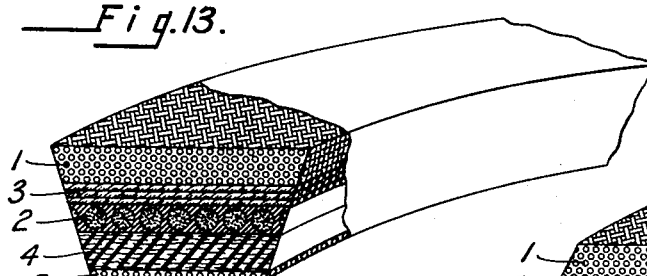
Figure 13 is a like view of Fig. 12 showing the transverse cords only above the longitudinal cords.
Figure 16:
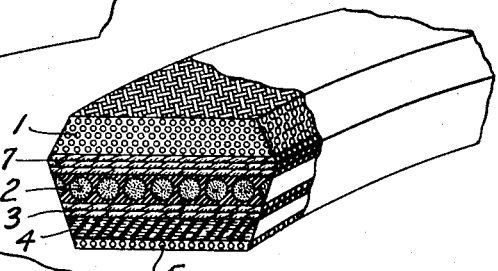
Figure 16 is a section through a hexagonal form of belt having the construction of this invention. The hexagonal form of belt is particularly adaptable to railway car drives where there is a swinging movement between the driving and driven members with which the belt is cooperating.
Figure 14:
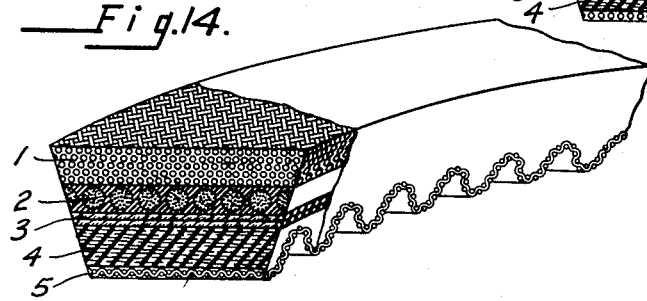
Figure 14 is a similar view to Fig. 13, but showing the transverse cords only below the longitudinal cords, and showing also the compression member formed to constitute a series of transverse cog teeth.

Fig. 14 shows in its members 1, 2, 3, 4 and 5 the construction and kinds of plies as disclosed in Fig. 13, with the compression member 5 made thicker and formed with cog teeth on the inner surface of this compression member. This, due to the formation, leaves intermediate grooves. This structure facilitates the bending of the belt and the consequent so-called compression of the inner member when the belt is traveling over or on the pulleys.

It will be noted that in Fig. 1 there are present the extensible outer member B of bias-cut square fabric, the longitudinal neutral axis cord member C and the transverse strut cord member D, which primary features appear in all of the views of the several modifications. Such features are common to all the forms. From those features as a basis all the modifications are built.

I desire to comprehend within my invention such modifications as may be clearly embraced within the claims and scope of my invention.

Having thus fully described my invention what I claim is new and desire to secure by Letters Patent, is:

1. In a power driving V-belt, the combination of a member composed of vulcanized rubber and fabric, with the fabric threads or cords oblique; a vulcanized rubber and cord fabric member with its cords longitudinal connected to the under side of said first member; and a connected vulcanized rubber and fabric member whose cords are transverse of the belt, said last-named members being adjacent and parallel.

2. A power driving V-belt having therein an outer extensible tension member of vulcanized rubber and fabric whose cords or threads are oblique, a connected neutral axis member therebelow of vulcanized rubber and fabric whose cords are longitudinal, and a compression member below said neutral axis member and formed of vulcanized rubber and fabric whose cords are transverse.

3. In a power driving belt, the combination of a tension member of vulcanized rubber and fabric whose threads or cords are oblique, a neutral axis member of vulcanized rubber and fabric whose cords are longitudinal, and two members each of vulcanized rubber and cord fabric, whose cords are transverse, one such last-named member being between said tension member and said neutral axis member and the other being below and adjacent the longitudinal cord member and said members being parallel.

4. In a power belt having driving side walls, the combination of an extensible tension member composed of vulcanized rubber and fabric, whose threads or cords are oblique, a neutral axis member composed of vulcanized rubber and cord fabric whose cords are longitudinal, and two members each composed of vulcanized rubber and fabric whose cords are transverse, one such transverse cord member being between said tension and neutral axis member and the other such member below and adjacent the said neutral axis member.

5. In a power driving belt, the combination of a member composed of vulcanized rubber and fabric, with the fabric threads or cords oblique; an adjacent vulcanized rubber and cord fabric member therebelow with its cords longitudinal; a vulcanized rubber and fabric member whose cords are transverse of the belt adjacent said last-named member; and a compression member below said last-named member comprising fiber impregnated rubber, said members being parallel.

6. In a power driving belt, the combination of an external member composed of vulcanized rubber and fabric, with the fabric threads or cords oblique; a vulcanized rubber and cord fabric member below said first-named member with its cords longitudinal; a vulcanized rubber and fabric member whose cords are transverse of the belt and are located above the neutral axis member and adjacent the external member; and a compression member below said neutral axis member including a component of fiber impregnated rubber, said members being parallel.

7. In a belt, relatively heavy, parallel, neutral axis, concentrically wound cords, a compression section beneath and adjacent the cords, and a tension section above and adjacent the cords, said compression section being composed of transversely arranged, rubber-imbedded cords and said tension section being composed of transversely arranged, rubber-imbedded cords, the arrangement of the tension cords being diagonal to the neutral axis cords, said sections and said cords being parallel.

8. In a power driving belt, the combination of a tension member composed of vulcanized rubber and fabric, with the fabric threads oblique; a vulcanized rubber and cord fabric member with its cords longitudinal disposed adjacent and beneath said tension member; a vulcanized rubber and fabric member whose cords extend continuously around and are transverse of the belt disposed adjacent and beneath said second member; and an outer wrapper of rubberized fabric vulcanized to the belt proper.

9. In a power driving belt, the combination of a member composed of vulcanized rubber and fabric, with the fabric threads oblique; a vulcanized rubber and cord fabric member with its cords longitudinal disposed adjacent and beneath said first named member; a vulcanized rubber and fabric member whose cords extend continuously around and are transverse of the belt disposed adjacent and beneath said second member; and an outer wrapper of rubberized fabric vulcanized to the belt proper; and enclosing the bottom, sides and upper surface of the belt.

10. In a belt, a compression section including a rubber and fiber layer, the fibers being arranged transversely of the belt, a layer of transverse rubber-imbedded cords adjacent and above said first named layer, a layer of longitudinal, circumferential cords disposed adjacent and above said second named layer at the neutral axis of the belt, a layer of transverse cords rubber-imbedded adjacent and above said layer of circumferential cords, and a layer of diagonal cords rubber-imbedded disposed adjacent and above said last named layer, and a cover for said belt.

11. In a hexagonal belt having V-shaped side walls, a tension section having a plurality of transversely arranged, rubber-imbedded cords, a neutral axis section abutting the lower surface of said tension section and having a plurality of rubber-imbedded, circumferential cords that are inextensible, a section adjacent and below said neutral axis section and having a plurality of transversely arranged, rubber-imbedded cords, a fiber impregnated compression section beneath and adjacent said last named section, and a cover for said belt.

12. In a hexagonal belt, a tension section disposed outwardly between the downwardly and outwardly inclined side walls of the belt, an outer lateral stiffening section adjacent said tension section and disposed partly between the downwardly and outwardly inclined side walls of the belt and partly between the upwardly and outwardly inclined side walls of the belt, a neutral axis section beneath and adjacent said outer lateral stiffening section, an inner lateral stiffening section beneath and adjacent said neutral axis section, a compression section beneath and adjacent said inner lateral stiffening section, said neutral axis section, said inner lateral stiffening section, and said compression section being disposed between the upwardly and outwardly inclined side walls of the belt, said neutral axis section comprising longitudinal cords imbedded in rubber and said lateral stiffening sections comprising layers of transverse cords, said layers being parallel and adjacent said neutral axis section, and a wrapper of rubberized fabric disposed about said sections and vulcanized thereto.

13. In a V-belt, a neutral axis member comprising longitudinal cords imbedded in rubber and adapted to include the neutral axis of the belt, a compression member formed of fiber reinforced rubber with the reinforcing fibers disposed transversely of the length of the belt and substantially parallel to one another, an intermediate lateral reinforcement member formed of transverse rubber and imbedded cords joined to said first and second named members, and a wrapper of rubberized fabric enclosing the bottom, sides and upper surface of the belt.

14. In a V-belt, a neutral axis member comprising longitudinal cords imbedded in rubber and adapted to include the neutral axis of the belt, a compression member formed of fiber reinforced rubber, a pair of reinforcing members formed of rubberized transverse cords, one of said members being disposed between said neutral axis member and said compression member, and the other being disposed adjacent the opposite side of said neutral axis member, and a wrapper of rubberized fabric enclosing the bottom, sides and upper surface of the belt.

15. In a V-belt, an upper tension member composed of vulcanized rubber and fabric with the threads or cords oblique, a neutral axis member formed of longitudinal cords imbedded in rubber and disposed beneath said tension member, a compression section formed of rubber impregnated with fiber extending laterally thereof, said compression member being disposed beneath said neutral axis member, and lateral reinforcing members disposed between said tension member and said neutral axis member, and between said neutral axis member and said compression member respectively, said lateral reinforcing members comprising transverse rubberized cords, and a woven fabric wrapper enclosing the top, bottom, and sides of said belt.

ABRAHAM L. FREEDLANDER.